United States Patent [19]

Taji et al.

[11] Patent Number: 5,113,573
[45] Date of Patent: May 19, 1992

[54] STATOR MANUFACTURING METHOD

[75] Inventors: Ryoichi Taji; Takushi Takizawa, both of Himeji, Japan

[73] Assignee: Mitsubishi Denki K.K., Tokyo, Japan

[21] Appl. No.: 690,248

[22] Filed: Apr. 24, 1991

[30] Foreign Application Priority Data

Apr. 26, 1990 [JP] Japan .................................. 2-108640

[51] Int. Cl.⁵ ............................................. H02K 15/06
[52] U.S. Cl. ........................................ 29/596; 29/606
[58] Field of Search .................. 29/596, 606, 736, 732

[56] References Cited

U.S. PATENT DOCUMENTS 4,741,098  5/1988  Barrera ........................... 29/596 X
4,857,787  8/1989  Taji et al. .

FOREIGN PATENT DOCUMENTS

0209091  7/1986  Fed. Rep. of Germany .
0274969  12/1987  France .
2076710  6/1981  United Kingdom .

Primary Examiner—Carl E. Hall
Attorney, Agent, or Firm—Sughrue, Mion, Zinn, Macpeak & Seas

[57] ABSTRACT

A method for manufacturing a stator of a motor having a coil wound on a ring-shaped core having a plurality of slots. The coil is first preformed into a chevron-shape before being mounted on the core so that the chevron-shaped coil comprises front coil end portions positioned within the inner diameter of the core, slot coil portions positioned at the diameter of the slots and having substantially the same configuration as the slots, rear coil end portions positioned between the slot coil portions, and transition coil portions positioned between the front coil end portion and the slot coil portions. This preformed coil is inserted into the core from its end face and the front coil end portions are bent toward the outside of the inner diameter of the core.

6 Claims, 10 Drawing Sheets

STATOR MANUFACTURING METHOD

BACKGROUND OF THE INVENTION

This invention relates to a stator manufacturing method in which a coil is wound on a ring-shaped core having a plurality of slots.

Figure 10:
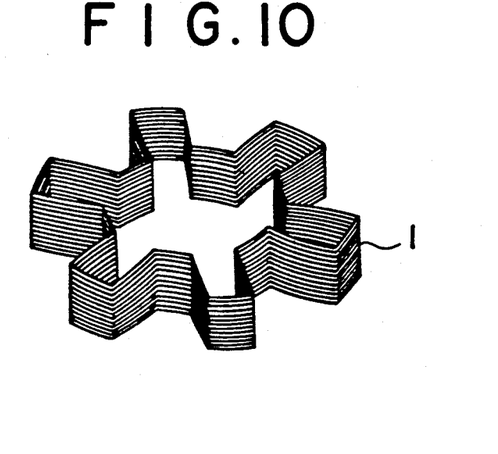
FIG. 10 is a perspective view of one example a conventional coil.

FIG. 10 is an overall perspective view of a coil 1 to be wound on a core of a conventional vehicular ac generator. The coil 1 is in the form of a so called starshaped coil in which a conductor is wound into a ring having a required number of turns and provided with projections and recesses corresponding to the number of poles.

Figure 11:
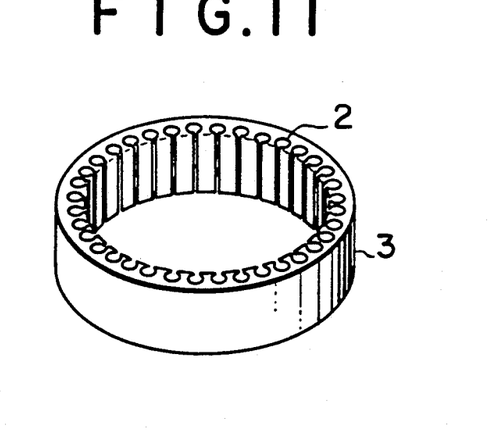
FIG. 11 is a perspective view of the core.
Figure 12:
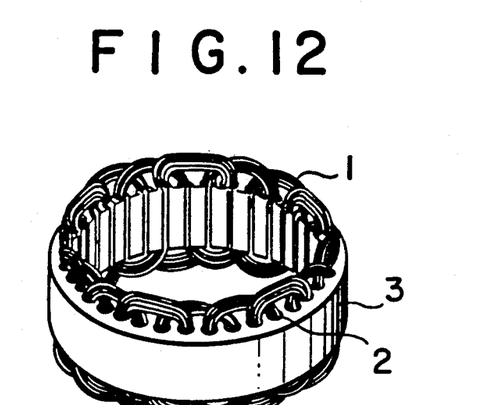
FIG. 12 is a perspective view of the stator in which the coil is wound on the core.

FIG. 11 shows a core 3 having formed in its inner periphery a plurality of slots 2. When the coil 1 is inserted into these slots 2, a stator as illustrated in FIG. 12 is obtained.

FIGS. 13 to 16 are views illustrating the steps of inserting the coil 1 into the slots 2, in which 5 is a coil guide holder, 6 are coil guides supported by the coil guide holder 5, and 7 is a coil pusher slidable reciprocally along the coil guides 6.

Figure 13:
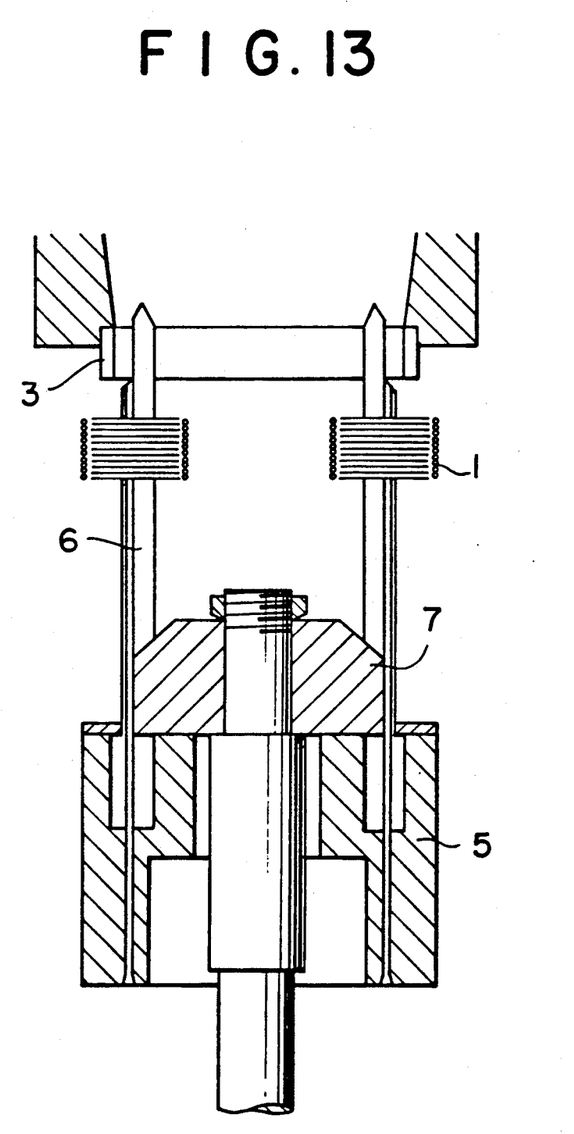
FIGS. 13 to 16 are views illustrating the steps of inserting the coil into the core.
Figure 14:
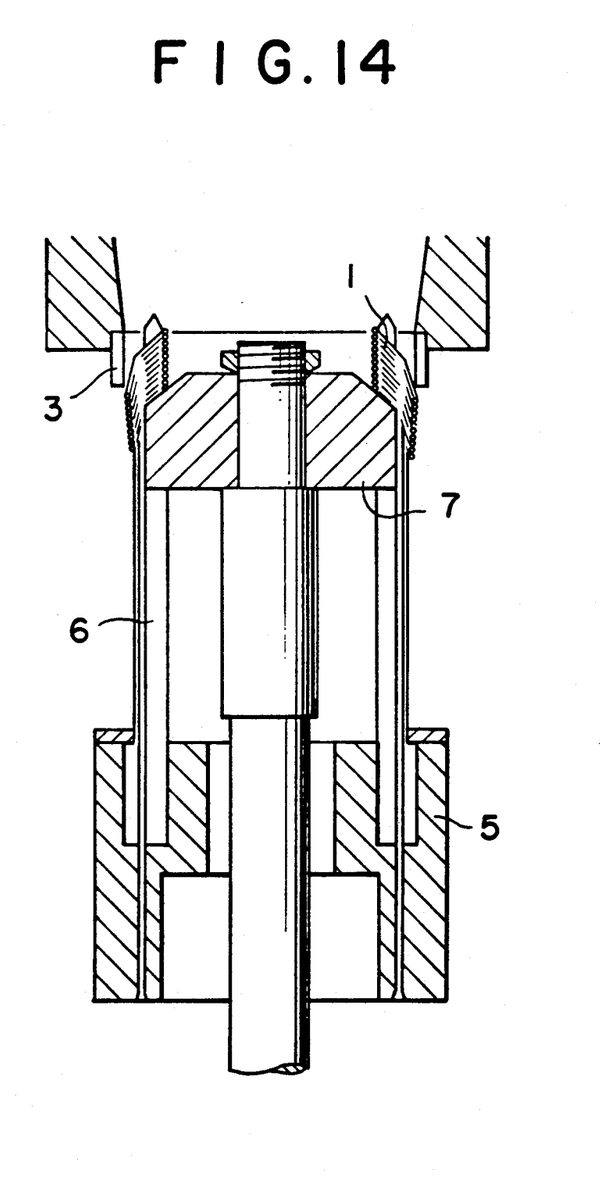
Figure 15:
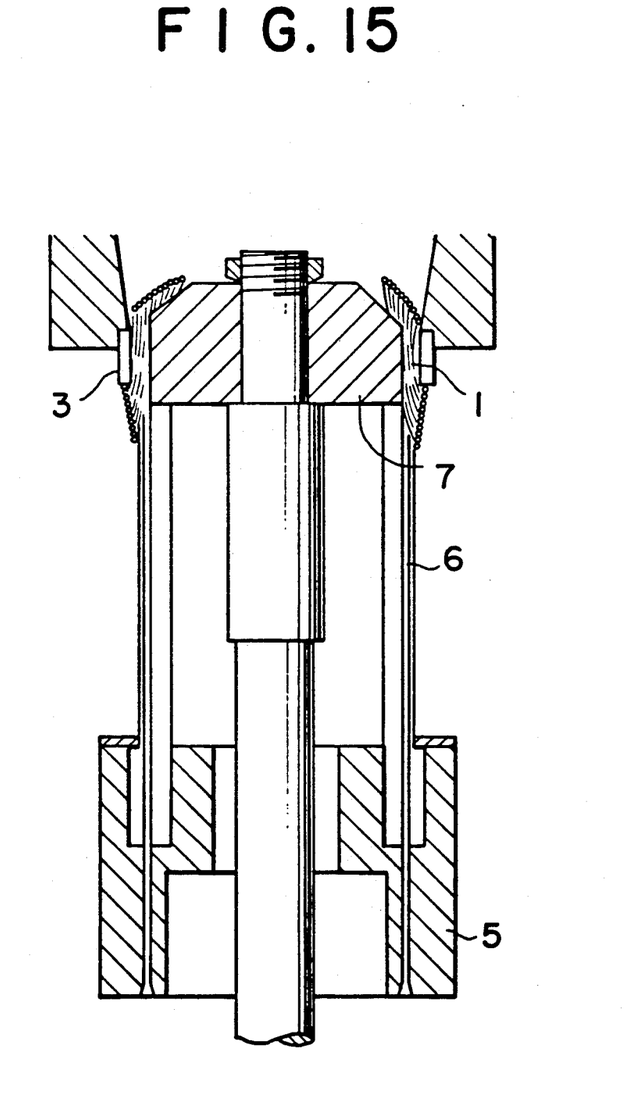
Figure 16:
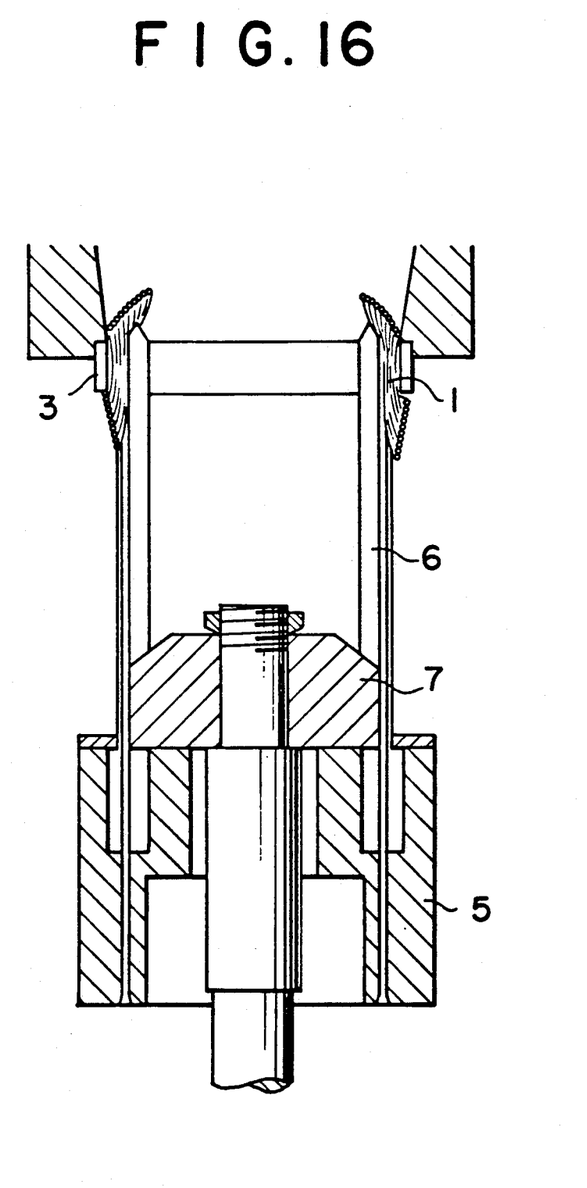

In order to insert the coil 1 into the slots 2, the coil 1, which was prepared by winding an electric conductor into a ring having a necessary number of turns and formed to have radial projections and grooves corresponding to the number of poles, is mounted to the coil guides 6 (see FIG. 13). In this state, the coil 1 is lifted up by the coil pusher 7 so that the coil 1 is brought into contact with the core 3 and deformed (see FIG. 14). By further lifting up the coil pusher 7, the coil 1 is completely inserted within the slots 2 (see FIG. 15). Thereafter, the coil pusher 7 is lowered back to its original position (see FIG. 16).

According to the conventional stator manufacturing method for a vehicular a.c. generator stator, during the insertion of the coil 1 into the slots 2, the coil 1 is deformed while it is being pushed and rubbed against the core 3, the coil guides 6, coil pusher 7 and the like under an insertion pressure, so that the insulation coating of the coil 1 and the core 3 may be damaged, especially when a stator having a high space factor coil is to be manufactured.

Also, even when the coil 1 is aligned to the core 3 before insertion, it is in a misaligned state when inserted and the slot coil portion and the coil end portion are not in alignment, so that the space factor of the coil with respect to the core, the space efficiency and the cooling efficiency are disadvantageously lowered.

The stator manufacturing method of the present invention has been made to solve the above problem and has as its object the provision of a stator manufacturing method which can manufacture a stator which a high coil space factor with respect to the core, high space efficiency and high cooling efficiency.

SUMMARY OF THE INVENTION

Accordingly, the stator manufacturing method of the present invention comprises the steps of pre-forming the coil into a chevron-shape before mounting on the core, the chevronshaped coil comprising a front coil end portion positioned within the inner diameter of the core, slot coil portions positioned at the diameter of the slots and having substantially the same configuration as the slots, a rear coil end portion positioned between the slot coil portions, and a transition coil portions positioned between the front coil end portion and the slot coil portions, inserting the preformed coil into the core from its end face, and deforming the front coil end portion toward the outside of the inner diameter of the core.

According to the present invention, the coil is formed into a configuration corresponding to the coil configuration inserted in the core, and the coil is inserted into the core.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1:
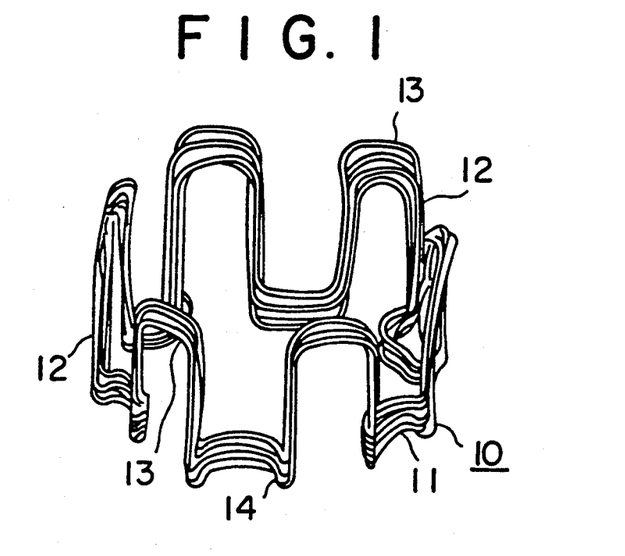
FIG. 1 is an overall perspective view of one embodiment of the present invention.
Figure 2:
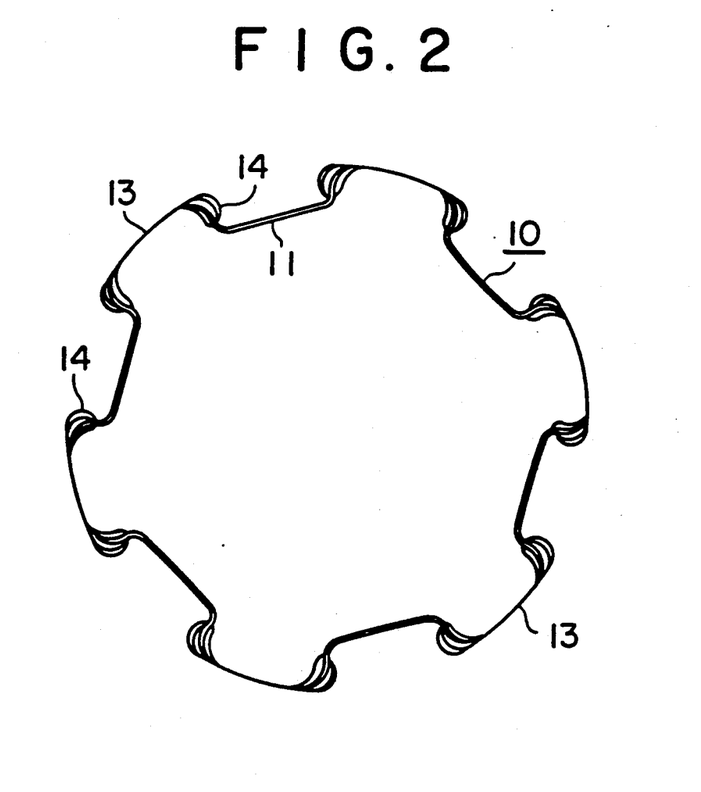
FIG. 2 is a plan view of FIG. 1.

An embodiment of the present invention will now be described in conjunction with the drawing. FIG. 1 is a perspective view of one embodiment of a coil to be mounted to a vehicular ac generator core and FIG. 2 is a plan view of FIG. 1. The same components as those in FIGS. 10 to 16 are designated by the same reference numerals and their description is omitted.

In the figures, 10 is a coil to be inserted into the core 3, and the coil 10 is preformed from the star-shaped coil 1 into a configuration corresponding to that of the coil inserted in the core 3. 11 are front coil end portions (also referred to as upper brights) which become front coil ends after the coil 10 is inserted in the core 3 and are positioned inwardly of the inner diameter of the core 3. 12 are slot coil portion (also referred to as legs) which are disposed within the slots 2 when the coil 10 is mounted to the core 3. The slot coil portions 12 are positioned at the diameter of the slots 2 of the core 3 and configured in correspondence with the slots 2. 13 are rear coil end portions (also referred to as lower brights) disposed between the slot coil end portions 12, and 14 are transition coil portions disposed between the front coil end portions 11 and the slot coil portions 12.

Figure 3:
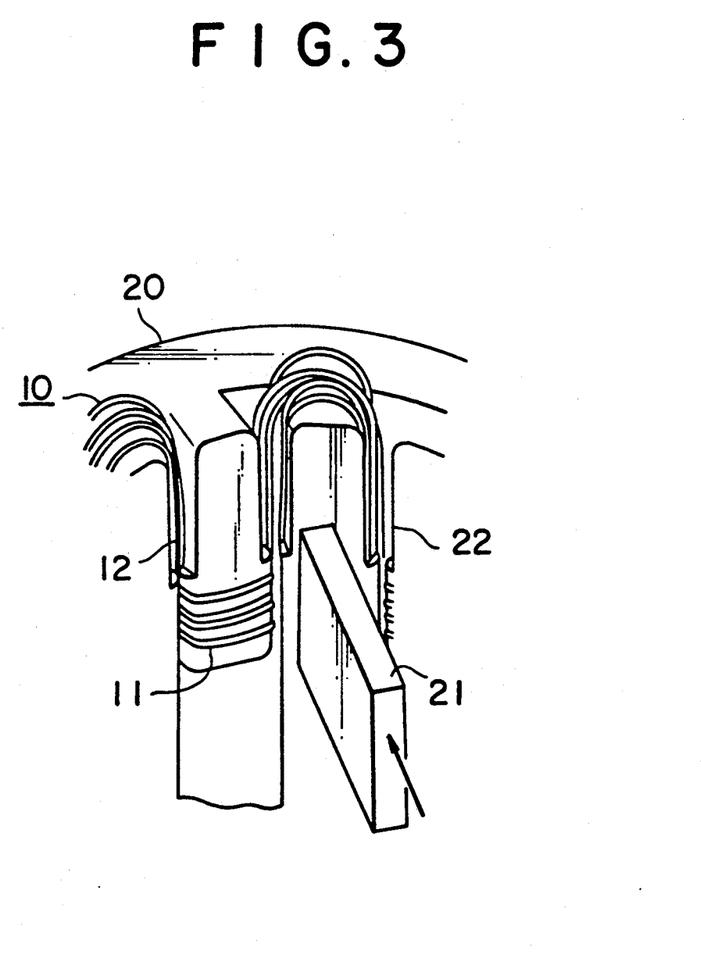
FIG. 3 is a view illustrating the manner in which the coil is pressure-formed.

FIG. 3 is a view illustrating the manner in which the coil 10 is preformed, wherein 20 is a pressure-forming jig having a configuration similar to that of the slots 2 of the core 3, and 21 is a pressure punch for pressing the coil contained within the grooves 22 formed in the pressure-forming jig 20 with a static pressure. The coil 10 is formed by the pressure-forming jig 20 and the pressure punch 21 in several steps so that the electrically insulating coating on the coil 10 is not damaged during this forming operation.

Figure 4:
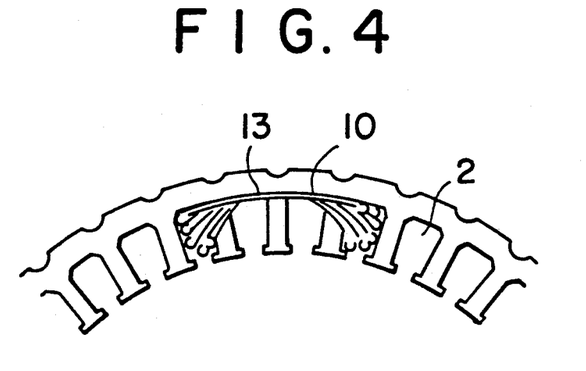
FIGS. 4 to 6 are views illustrating the rear coil end where the first phase coil, the second phase coil and the third phase coil are inserted into the respective core slots.
Figure 5:
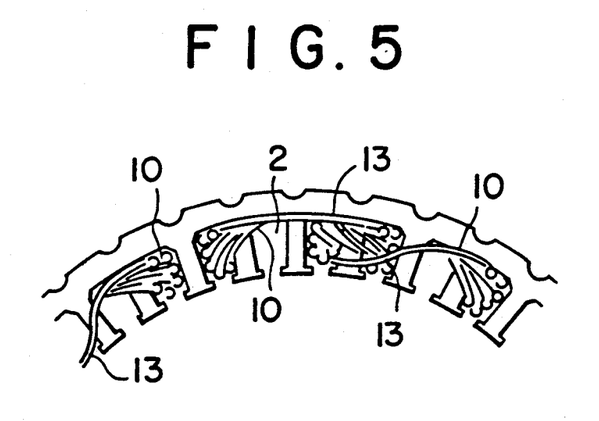
Figure 6:
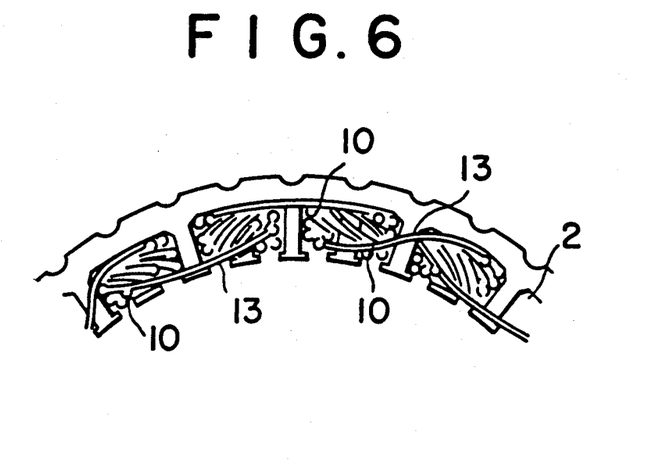

FIGS. 4 to 6 illustrate the state of the rear coil end portions 13 when the first, the second and the third phase coils 10, respectively, are inserted into the core 3. The rear coil end portions 13 of the respective phases have different configurations so that each coil end portion does not interfere with the insertion of each other phase coil 10.

Figure 7:
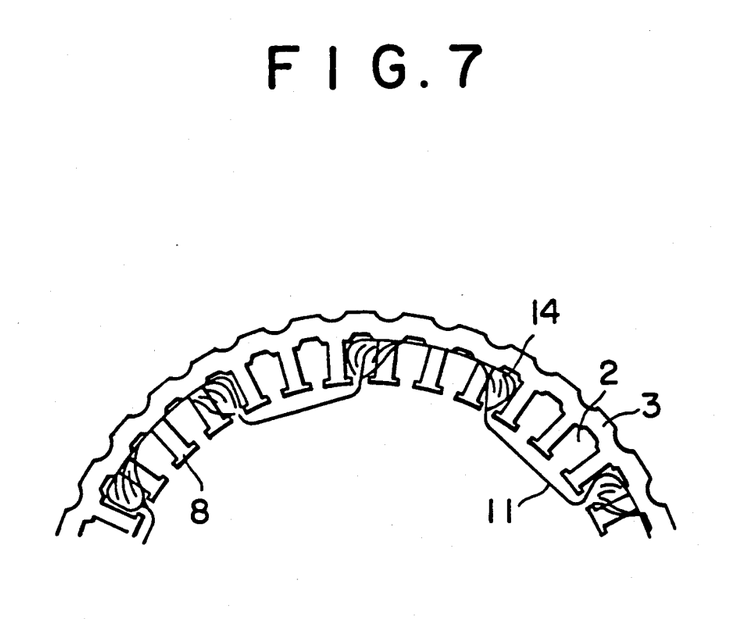
FIG. 7 is a view illustrating the state in which the coil of FIG. 1 is inserted from the core end face.

The chevron-shaped coils 10 as above-formed are inserted into the core 3 from its end face. At this time, as illustrated in FIG. 7, the slot coil portion 12 (FIG. 3) is positioned at the same diameter as the slots 2 during the entire insertion process, and the front coil end portions 11 are inwardly of the inner diameter of the core 3, and in this situation, the coil end portions 11 are forced to override the teeth 8 to be inserted into the core 3. Also, the transition coils 14 pass through the slot openings 9 of the core 3 when they are stacked in a vertical position. Thereafter, the the front coil end portions 11 are deformed radially relative to the inner diameter of the core 3 and the operation of winding the coil 10 onto the core 3 is completed. The above deformations of the coil conductors are carried out with relatively small forces, so that no electrical insulation on the front coil end portions 11 is destroyed.

Figure 8:
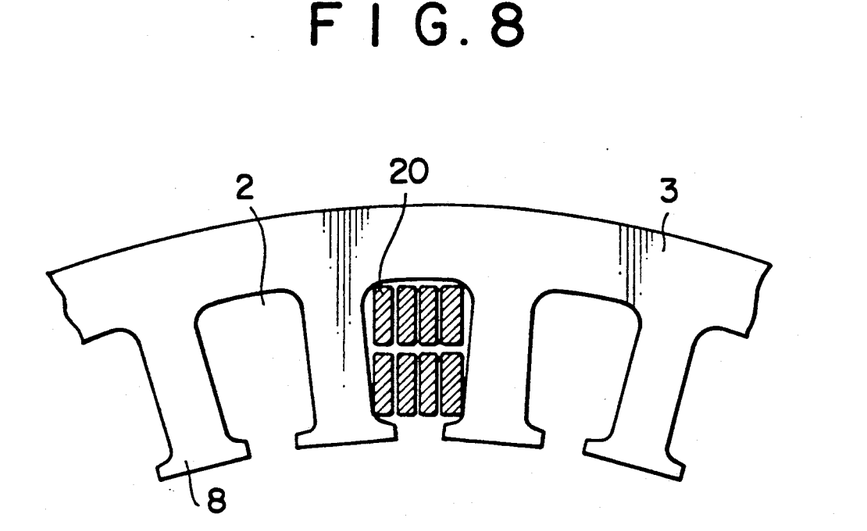
FIG. 8 is a sectional view illustrating the core of another embodiment of the present invention.
Figure 9:
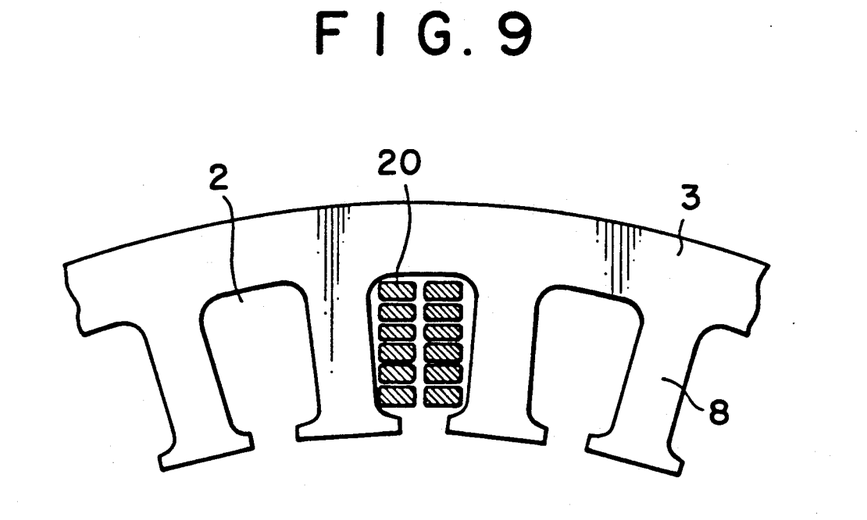
FIG. 9 is a sectional view illustrating the core of a still another embodiment of the present invention.

FIGS. 8 and 9 are sectional views illustrating the stator to which coil conductors 20 of a rectangular crosssection are inserted into the slot 2 by the same process as that described above.

While the present invention has been described in terms of an embodiment of a stator manufacturing method for a vehicular ac generator, the present invention can be equally applied to an ac generator stator for the purpose other than vehicles.

As has been described, according to stator manufacturing method of the present invention, since the coil is pre-formed into a configuration corresponding to that after it is inserted into the core and this preformed coil is inserted into the coil, the coil is not subjected to deformation even when it is inserted into the core and the electrical insulating coatings on the coil and the core are not damaged. Also, since the slot coil portions are inserted into the core slots with their alignment is maintained, the space factor of the coil in the slots is high and the alignment is maintained at the front and the rear coil end portions, so that the high space factor and the cooling efficiency are advantageously obtained.

What is claimed is:

1. A stator manufacturing method in which a coil is wound on a ring-shaped core having a plurality of axially oriented teeth with coil accommodating slots defined therebetween, comprising the steps of:
    preforming said coil into a chevron-shape before mounting on said core, said chevron-shaped coil comprising lower coil portions (11) positioned within an inner diameter of said core, leg coil portions (12) positioned at the diameter of said slots and having substantially the same configuration as said slots, upper coil portions (13) positioned between said leg coil portions, and transition coil portions (14) positioned between said lower coil portions and said leg coil portions;
    axially inserting said preformed coil into an upper face of the core, such that lower ends of said leg coil portions axially enter corresponding front ends of the slots and traverse a length of said slots until said upper coil portions contact upper ends of corresponding teeth; and
    bending said lower coil portions around lower end portions of the teeth of said core.

2. The stator manufacturing method of claim 1, wherein said preforming step further comprises:
    placing said coil in a pressure-forming jig having a configuration similar to the core configuration, in order to create said chevron-shape in said coil.

3. The stator manufacturing method of claim 2, wherein said preforming step further comprises:
    pressing the legs of the coil into grooves of the jig with a pressure punch with a static pressure.

4. A stator manufacturing method in which a coil is wound on a ring-shaped core having a plurality of axially oriented teeth with coil accommodating slots defined therebetween, comprising the steps of:
    a) preforming the coil to an undulating cylindrical configuration defined by a plurality of axially parallel circumferentially spaced legs adapted to axially enter upper end portions of associated slots, a plurality of upper bights extending between alternate upper ends of the legs and adapted to overlie associated upper ends of the teeth, and a plurality of lower bights extending between alternate lower ends of the legs, said lower bights being positioned radially inwardly of the upper bights,
    b) axially inserting the preformed coil into an upper end of the core such that the legs individually enter upper ends of associated slots, and slide axially along an interior of the slots until the associated upper bights contact upper tooth ends, and
    c) bending the lower bights downwardly and diametrically outwardly such that they underlie associated lower tooth ends,
    d) to attendantly minimize coil insertion bending deformations and insulation ruptures resulting therefrom.

5. The stator manufacturing method of claim 4, wherein said preforming step further comprises:
    placing the coil in a pressure-forming jig having a configuration similar to the core configuration, to create the undulated coil shape.

6. The stator manufacturing method of claim 5, wherein said preforming step further comprises:
    pressing the coil into grooves of the jig with a pressure punch with a static pressure.

* * * * *